Patented Apr. 4, 1944

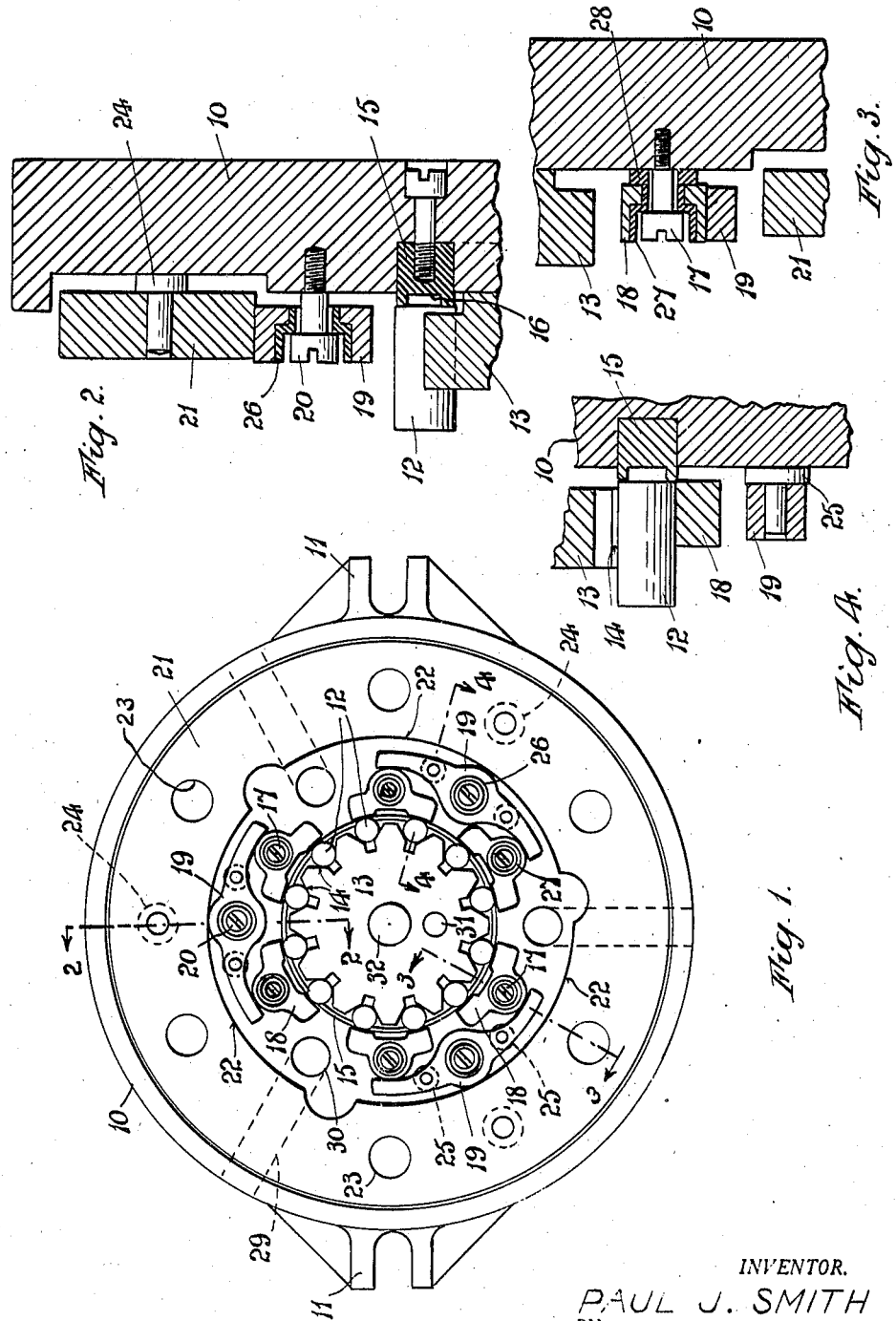

2,346,053

UNITED STATES PATENT OFFICE 2,346,053

MULTIPLE CHUCK

Paul J. Smith, Ferndale, Mich.

Application September 9, 1943, Serial No. 501,711

10 Claims. (Cl. 90—59)

This invention relates to means for chucking small articles, such as cylindrical or other shaped pins, in multiple so that they may be squared, slotted, or otherwise machined or treated; and has for its object to provide a simple, robust and easily operated chuck in which a number of pins or articles may be engaged and secured firmly and accurately.

More particularly, the said invention contemplates the utilizing of a multiplicity of cam operated jaws arranged in radial relation to a circular series of V blocks or otherwise shaped fixed holding means formed in a unitary structure, whereby said jaws may be closed on pins or other articles positioned in the said V blocks, or fixed holding means.

The said invention further contemplates, in a device of the type just referred to, the utilizing of a circular series of clamps, each spanning a pair of adjacent pins or other articles positioned in the fixed holding means, and a second series of clamps each spanning a pair of the first mentioned series of clamps, said second series being subject to the primary closing effect of an operating cam.

A further object of the invention is to provide for the self-aligning of the clamps on the work whereby pressure on the several pins engaged by a clamp is equalized; and it is further contemplated to provide for the rocking of the clamps on pins or supports which are movable radially of the chuck, whereby such rocking will result in the self alignment feature referred to.

A further object of the invention is to provide for the interposing of non-magnetic material between relatively movable parts of the device which might otherwise have a tendency to be magnetically locked together against free adjustment in the event of the chuck being used on a magnetic face plate or support.

A still further object is to provide for a replaceable stop ring or rest for the inner ends of the pins or articles to be held in the chuck.

Still further objects and advantages subsidiary to or resulting from the construction or operation of the invention as it may be carried into effect will become apparent as the said invention is hereinafter further disclosed.

In carrying the said invention into effect, I may provide a base-plate adapted to be attached magnetically or otherwise to the face-plate or bed of a machine, this base-plate having secured thereto a work-supporting member provided with V or other suitedly shaped grooves arranged in an accurately circular manner about the working center of the device, a circular series of rocking and radially movable clamps carried by said base-plate and each spanning an adjacent pair of the said grooves, whereby each clamp may be movable into engagement with a pair of pins or other work positioned in said grooves, a further circular series of similarly rocking and radially adjustable clamps each spanning an adjacent pair of said first mentioned clamps, and a cam plate engaged and movable with respect to said last mentioned clamps whereby they may be moved radially and in turn effect the radial movement of said first mentioned clamps into engagement with the pieces of work carried by the mandrel. All of which is more particularly described and ascertained hereinafter, by way of example, having reference to the accompanying drawing, wherein:

Figure 1 is a plan view of the improved chucking device;

Figure 2 is a detail section taken on a plane indicated by the line 2—2 in Figure 1; and substantially enlarged;

Figure 3 is a detail section taken on a plane indicated by line 3—3 in Figure 1; and Figure 4 is a detail section taken on a plane indicated by the line 4—4 in Figure 1.

Similar characters of reference indicate similar parts in the several figures of the drawing.

The base-plate 10, usually of circular form, may be provided with lugs 11 for attachment to the face plate or bed of a machine as will be understood, although these lugs may be eliminated if the device is intended for use on a magnetic support.

Any suitable means, not shown, for centering the base-plate on the face-plate may be provided in accordance with the general practice.

The device is illustrated as being utilized for end machining of pins 12, which are held on a mandrel 13, provided with peripheral slots or V grooves so that the said mandrel is virtually a circular series of V blocks in a unitary structure. Obviously, the said grooves are accurately machined in relation to the axis of the device in order to insure that the work is squarely positioned. I prefer to recess into the base-plate, immediately behind the circular series of work supporting V blocks, a stop ring 15, which may be provided with a relief groove 16, the stop ring thereby definitely positioning the inner ends of the work as is usually desirable in order to obtain accuracy of length in the several pieces after they are machined. Loosely mounted on shoulder screws 17, extending from the face of the baseplate and arranged in circular series thereon with relation to the series of V blocks are rocking clamps 18, having end arms extending over a pair of adjacent pins 12, whereby inward radial movement of said clamps toward the center line of the face-plate will result in the clamp distributing the pressure resulting from such movement evenly on each of the pins engaged by the arms of the clamps, as will be readily apparent from an examination of Figure 1, of the drawing. Clearance provided between the said clamps and their respective pivot screws, permits both this radial and rocking movement, and detailed description of this action does not appear to be called for.

The actual method of mounting these rocking clamps to permit these two movements is not an essential feature of the invention as it will be clear to anyone skilled in the mechanical arts that various well known methods of mounting the clamps may be availed of to permit such movement.

Further clamps 19 are also shown arranged in circular series, external of the series of clamps 18, previously described, and similarly mounted on shoulder screws 20, the end arms of this second series of clamps 19 spanning and engaging the adjacent pair of said clamps 18, whereby inward radial movement of the said clamps 19, is transferred through the arms thereof to the adjacent pair of clamps 18 to effect the radial movement thereof hereinbefore referred to; and these clamps 19, being similarly mounted for both rocking movement and the movement radially of the chucking device, involve the same self equalizing feature in transmitting the closing pressure to the first mentioned series of clamps 18.

To effect the radial closing movement of clamps 19, on clamps 18, and in turn the closing movement of clamps 18 on the work, I provide rotary cam plate 21, having internal cammed surfaces 22, engaging the series of clamps 19, and formed to effect the radial movement of said clamps inwardly of the chucking device when said cam 21 is rotated in the required direction for that purpose.

23 are spanner wrench holes provided in the said cam plate to facilitate such rotation being effected by a suitable tool. 24 are spacer pins or buttons which may be of non-magnetic material to prevent magnetic binding between the cam ring and the base-plate should the device be utilized on a magnetic support. Similarly, the clamp members 19 are shown as provided with spacer pins or buttons 25.

To further prevent any tendency of the clamping members to bind under the influence of a magnetic support, I might provide them with non-magnetic bushings 26 and 27. Similarly, clamping members 18 could also be provided with non-magnetic spacing washers 28, between the said members and the face of the base-plate. 29 and 30 are simply passages to permit the flow and escape of coolant and foreign matter from the chucking device. Element 31 is a set screw or other locking device to prevent rotation of the mandrel on its pin or pilot 32.

It will be readily understood that while the device is illustrated as having the mandrel 13 arranged centrally of the device, and the cam 21 external of the clamping members, this arrangement may be obviously reversed within the scope of the invention, the work holding means being in the form of an internally slotted ring, increasing the number of work pieces which may be held, and the cam centrally disposed to move the clamping members outwardly toward the slotted ring. It is apparent that within the scope of my invention modifications and different arrangements may be made other than herein disclosed, and the present disclosure being illustrative merely, the invention comprehending variations thereof.

What I claim is:

1. In a device of the class described, a base-plate, a circular series of fixed work supports, a circular series of radially movable clamping jaws opposed to said supports, each jaw spanning a plurality of said supports, and a rotatable cam disposed to effect simultaneous movement of said jaws toward said supports when said cam is rotated for that purpose.

2. In a device of the class described, a base-plate, a circular series of fixed work supports, a circular series of radially movable clamping jaws opposed to said supports, each jaw spanning a pair of said supports, and a rotatable cam disposed to effect simultaneous movement of said jaws toward said supports when said cam is rotated for that purpose.

3. In a device of the class described, a base-plate, a circular series of fixed work supports, a circular series of radially movable clamping jaws opposed to said supports, each of said jaws being pivoted to rock relative to said supports, each jaw spanning a plurality of said supports, and a rotatable cam disposed to effect simultaneous movement of said jaws toward said supports when said cam is rotated for that purpose.

4. In a device of the class described, a base-plate, a circular series of fixed work supports, a plurality of work clamping jaws, said jaws being pivoted to rock relative to said supports, each jaw spanning a pair of said supports, and a rotatable cam disposed to effect simultaneous movement of said jaws toward said supports when said cam is rotated for that purpose.

5. In a device of the class described, a base-plate, a circular series of fixed work supports, a circular series of radially movable clamping jaws opposed to said supports, each jaw spanning a plurality of said supports, a second circular series of radially movable jaws, each spanning a pair of said first mentioned jaws, and a rotatable cam disposed to effect simultaneous movement of said second series of jaws radially against said first series of jaws to move the latter in turn toward said supports when said cam is rotated in the required direction for that purpose.

6. In a device of the class described, a base-plate, a circular series of fixed work supports, a circular series of radially movable clamping jaws opposed to said supports, said jaws being pivoted to rock relative to said supports, each jaw spanning a plurality of said supports, a second circular series of radially movable jaws, each spanning a pair of said first mentioned jaws, and a rotatable cam disposed to effect simultaneous movement of said second series of jaws radially against said first series of jaws, to move the latter in turn toward said supports when said cam is rotated in the required direction for that purpose.

7. In a device of the class described, a base-plate, a circular series of fixed work supports, a circular series of radially movable clamping jaws opposed to said supports, said jaws being pivoted to rock relative to said supports, each jaw spanning a plurality of said supports, a second circular series of radially movable jaws also pivoted to rock relative to said supports, each jaw of said second series spanning a pair of said first mentioned jaws, and a rotatable cam disposed to effect simultaneous movement of said second series of jaws radially against said first series of jaws, to move the latter in turn toward said supports when said cam is rotated in the required direction for that purpose.

8. In a device of the class described, a baseplate, a circular series of fixed work supports, a circular series of radially movable clamping jaws opposed to said supports, each jaw spanning a plurality of said supports, a second circular series of radially movable jaws, said second series of jaws being pivotally mounted to rock relative to said supports, and each spanning a pair of said first mentioned jaws, and a rotatable cam disposed to effect simultaneous movement of said second series of jaws radially against said first series of jaws to move the latter in turn toward said supports, when said cam is rotated in the required direction for that purpose.

9. In a device of the class described, a baseplate, a circular series of fixed work supports, a circular series of radially movable clamping jaws opposed to said supports, each jaw spanning a plurality of said supports, non-magnetic means spacing said jaws from adjacent parts of the device, and a rotatable cam disposed to effect a circular movement of said jaws toward said supports when said cam is rotated for that purpose.

10. In a device of the class described, a baseplate, a circular series of fixed work supports, a circular series of pins equally spaced radially from said work supports, clamping jaws loosely mounted on said pins for radial and rocking movement thereon, each jaw spanning a plurality of said supports, and a rotatable cam disposed to effect simultaneous movement of said jaws toward said supports when said cam is rotated for that purpose.

PAUL J. SMITH.